(12) United States Patent
Blanchard

(10) Patent No.: US 6,701,796 B2
(45) Date of Patent: Mar. 9, 2004

(54) DEVICE FOR TRANSMISSION BETWEEN A PRIMARY MOTOR SHAFT AND AN OUTPUT SHAFT AND LAWN MOWER COMPRISING SUCH A DEVICE

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 0 days.

(21) Appl. No.: 10/114,049

(22) Filed: Apr. 3, 2002

(65) Prior Publication Data

US 2002/0139204 A1 Oct. 3, 2002

(30) Foreign Application Priority Data

Apr. 3, 2001 (FR) ............................................. 01 04519

(51) Int. Cl.[7] ........................... F16H 3/08; A01D 69/10; A01D 69/08
(52) U.S. Cl. ............................. 74/325; 74/333; 74/355; 192/108; 56/11.3; 56/11.8
(58) Field of Search ................... 74/325, 333, 352, 74/355, 361, 425; 56/11.3, 11.7, 11.8; 29/893.31, 893.37; 192/107 M, 108

(56) References Cited

U.S. PATENT DOCUMENTS

| 4,117,652 | A | * | 10/1978 | Jones et al. | .................. 56/11.8 |
|---|---|---|---|---|---|
| 4,307,795 | A | * | 12/1981 | Roy | ........................ 192/69.82 |
| 4,343,396 | A | * | 8/1982 | George | .................. 198/781.08 |
| 4,835,949 | A | * | 6/1989 | Seyerle | ....................... 56/10.8 |
| 5,718,105 | A | * | 2/1998 | Irikura et al. | ................. 56/11.4 |
| 5,850,758 | A | * | 12/1998 | McCloud et al. | ............. 74/371 |

FOREIGN PATENT DOCUMENTS

JP          58168527 A   * 10/1983   ........... B29D/15/00

OTHER PUBLICATIONS

U.S. publication 2002/0178708A1 (Williams et al) Dec. 2002.*

* cited by examiner

Primary Examiner—Tisha D Lewis
(74) Attorney, Agent, or Firm—Young & Thompson

(57) ABSTRACT

A transmission device between a primary motor shaft and an output shaft (1) includes a casing (2) within which are disposed a reducing mechanism constituted by a driving member (3) in engagement with a driven member (4), the driven member (4) mounted freely rotatably on the output shaft (2) being adapted to be coupled with or uncoupled from the shaft (2) by a clutch mechanism mounted on the output shaft (2). The driven member (4) is a tangent toothed wheel, of synthetic material, at least the constituent material of the teeth (5) of the toothed wheel (4) incorporating a mineral or organic load increasing the resistance to the wear of the teeth (5).

13 Claims, 3 Drawing Sheets

DEVICE FOR TRANSMISSION BETWEEN A PRIMARY MOTOR SHAFT AND AN OUTPUT SHAFT AND LAWN MOWER COMPRISING SUCH A DEVICE

BACKGROUND OF THE INVENTION

The present invention relates to a device for transmission between a primary motor shaft and an output shaft, such as a drive shaft for the wheels of self-propelled machines, such as lawn mowers.

It relates more particularly to a device for transmission of the type comprising a casing within which are disposed a reducing mechanism constituted by a driving member, such as an endless screw in engagement with a driven member, such as a toothed wheel, the driven member, mounted freely rotatably on an output shaft, being adapted to be coupled or uncoupled with said shaft by means of a clutch mechanism mounted on said output shaft.

Transmission devices of the mentioned type are well known to those skilled in this art. In such devices, the members of the reducing mechanism are generally made of metal. The same is true for the constituent pieces of the clutch mechanism. The use of metallic members has various drawbacks. Thus, it leads to a transmission device of relatively great weight. Moreover, the constituent pieces of the mechanism are complicated to produce and of relatively high cost. However, because these mechanical pieces are greatly stressed, the manufacturers have naturally until now avoided the use of synthetic material, experiments that have been carried out resulting in breakage and too rapid wear of the pieces, which is incompatible with a long operating life, particularly in the case of application of such a transmission device to lawn mowers.

SUMMARY OF THE INVENTION

An object of the present invention is to provide a transmission device whose design permits the use of synthetic materials for certain pieces conventionally made of metal.

To this end, the invention has for its object a transmission device between a primary motor shaft and an output shaft, such as a drive shaft for the wheels of self-propelled machines, such as lawn mowers, of the type comprising at least one casing within which are disposed a reducing mechanism constituted by a guiding member, such as an endless screw in engagement with a driven member, such as a toothed wheel, the driven member, freely mounted for rotation on the output shaft, being adapted to be coupled or uncoupled with said shaft by means of a clutch mechanism mounted on said output shaft, characterized in that the driven member is a toothed tangent wheel, of synthetic material, at least the constituent material of the teeth of the toothed wheel incorporating a mineral or organic load increasing the resistance to wear of said teeth.

The incorporation of loading for the production of the driven member constituted by a toothed tangent wheel permits lessening the wear of the teeth of the toothed wheel and increasing their resistance. It renders compatible the use of a toothed wheel of synthetic material with a driving member of metal or synthetic material.

The invention also has for its object a self-propelled lawn mower of the type comprising a transmission device between a primary motor shaft and an output shaft for driving the wheels of the mower, this transmission device comprising at least one casing within which are disposed a reducing mechanism constituted by a driving member, such as an endless screw in engagement with a driven member, such as a toothed wheel, the driven member, mounted freely rotatably on the output shaft, being adapted to be coupled or uncoupled with said shaft by means of a clutch mechanism mounted on said output shaft, characterized in that the transmission device is of the mentioned type.

BRIEF DESCRIPTION OF THE DRAWINGS

The invention will be better understood from a reading of the following description of examples of embodiment, with reference to the accompanying drawings, in which.

DESCRIPTION OF THE PREFERRED EMBODIMENTS

Figure 1:
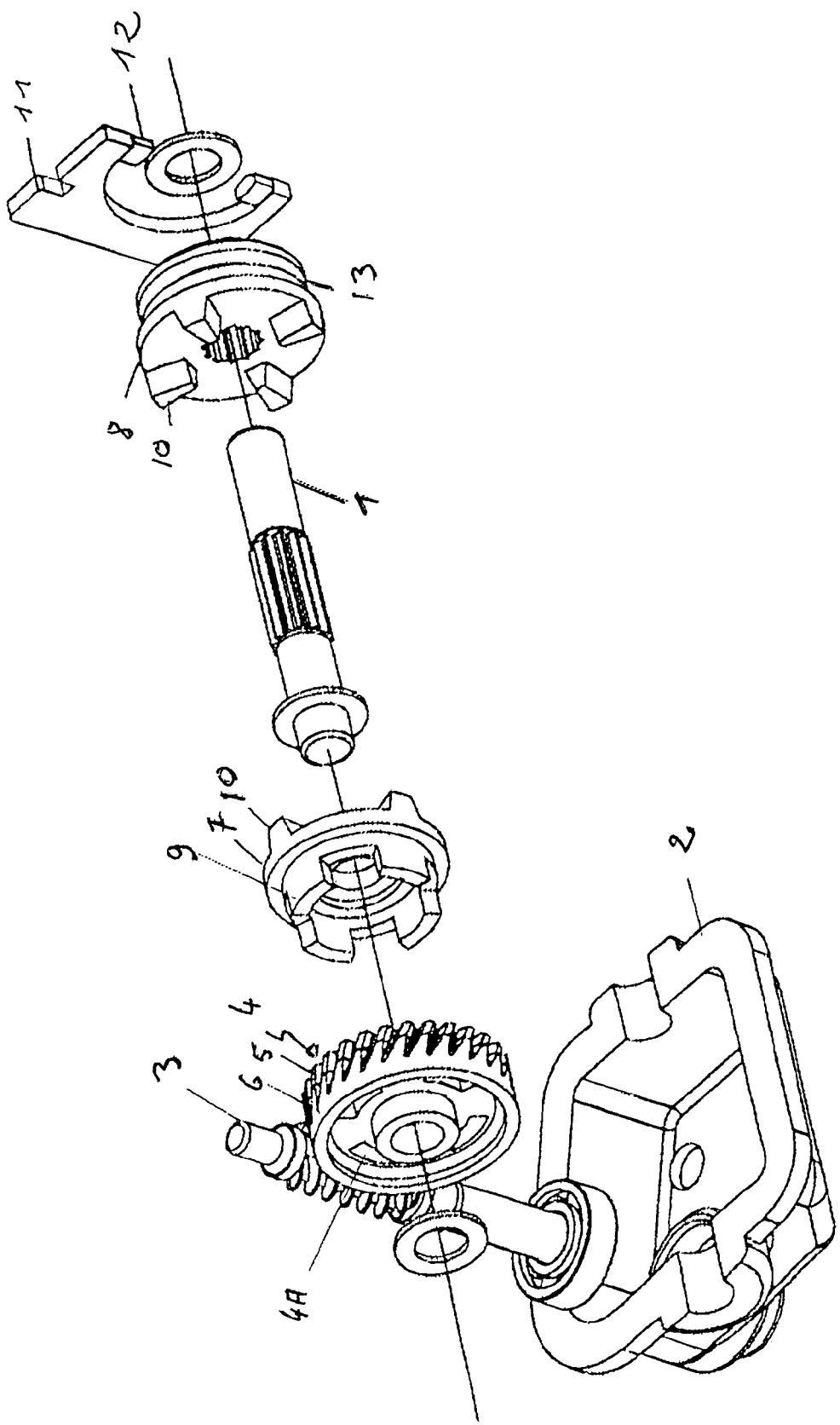
FIG. 1 is a fragmentary perspective view of a transmission device according to the invention in exploded condition of its constituent elements.

The transmission device according to the invention is more particularly adapted to be applicable to lawn mowers so as to ensure the transmission of movement between the primary motor shaft, generally the blade carrier of said mower, and the shaft for driving the wheels of the mower. This transmission device comprises, in a manner known per se, a casing 2 formed generally by the assembly of two half shells delimiting a joint plane. Within this casing 2 are disposed a reducing mechanism constituted by a driving member 3, such as an endless screw in engagement with a driven member 4, such as a toothed wheel. The driving member 3 projects at one end of casing 2 and is mechanically coupled to the motor shaft, generally by means of an endless transmission device of the type constituted by a belt running between the grooves of two pulleys mounted one on the primary motor shaft, the other on the driving member 3. The driven member 4 is freely mounted for rotation on the output shaft 1 and is adapted to be coupled with or uncoupled from this shaft 1 by means of a clutch mechanism traversed axially by the output shaft 1.

In a manner characteristic of the invention, the driven member 4 is a toothed tangent wheel of synthetic material, at least the material constituting the teeth 5 of the toothed tangent wheel 4 incorporating a mineral or organic load increasing the resistance to wear of said teeth 5 adapted to engage with the thread of the endless screw 3. The load is generally constituted by a material incorporated in the form of grains or fibers. Preferably, this load is constituted by glass fibers. The load represents 20 to 50% by weight of the total weight of the toothed wheel 4. The synthetic material of the toothed wheel 4 can itself be selected from the group of materials constituted by polyoxymethylene and polyamide.

Figure 2:
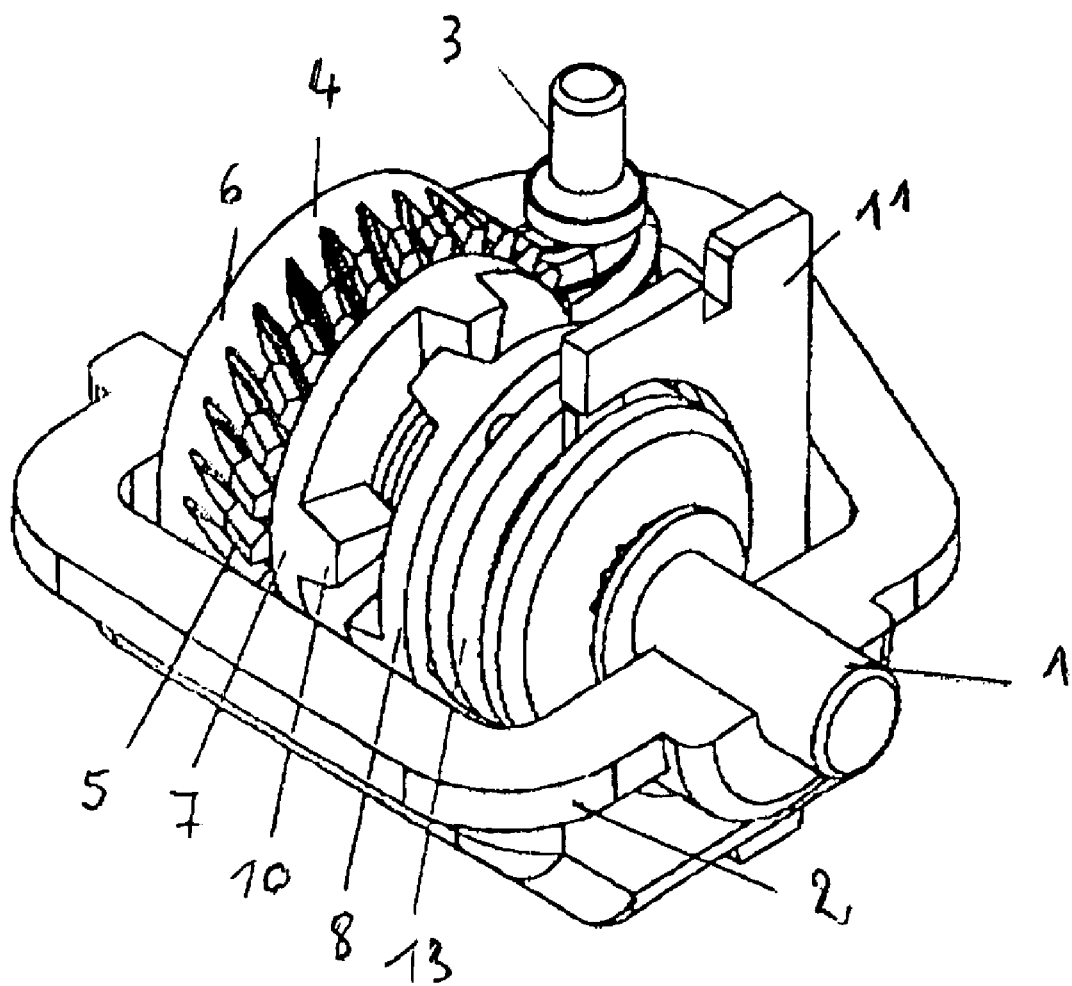
FIG. 2 represents a fragmentary perspective view of the elements of the transmission device in the assembled condition within the casing.
Figure 3:
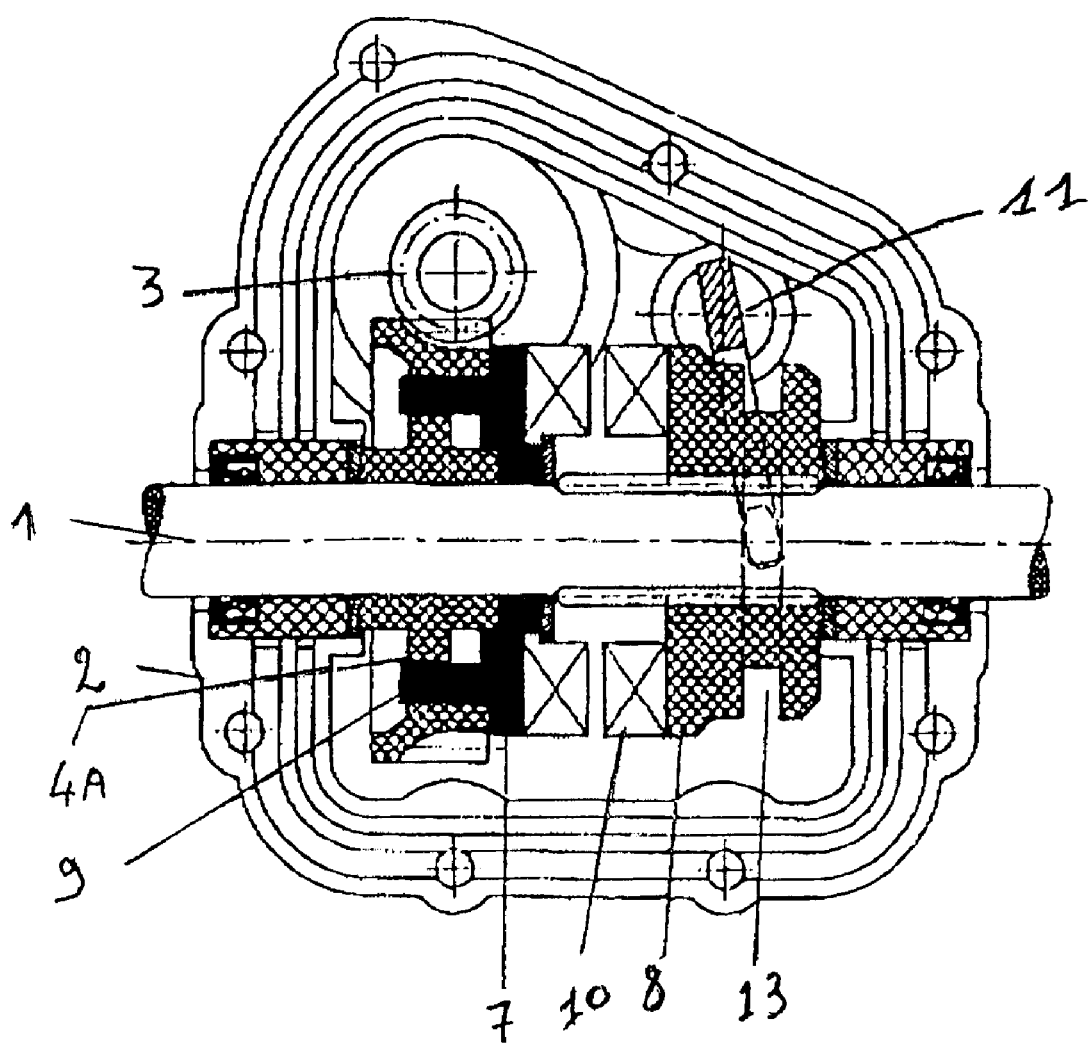
FIG. 3 is a cross-sectional view of the device of FIG. 2.

So as further to increase the resistance of the teeth of the tangent wheel 4, these teeth of the toothed tangent wheel 4 extend partially over the width of the wheel, as shown in FIGS. 1 and 2, to provide a region 6 in the form of a crown which is free from the teeth so as to ensure mechanical reinforcement of the wheel. Conversely, the pieces of the clutch mechanism are made of a synthetic material or of synthetic material free from glass fibers. Preferably, the synthetic material constituting the pieces of the clutch mechanism are selected from the group consisting at least of polyoxymethylene and polyamide.

The pieces of the clutch mechanism could also be made, if desired, one from the polyoxymethylene, the other from polyamide or be made of the same material.

In the illustrated examples, the clutch mechanism is a dog lug mechanism constituted by two hollow plates 7, 8, mounted on the output shaft 1 of the device. These hollowed plates 7, 8 carry, on their facing surfaces, teeth 10. One of the plates, shown at 7 in the figures, is secured in rotation to the toothed wheel 4 whilst the other plate 8 is securable in rotation to the output shaft 1. This plate 8, which can be secured in rotation with the output shaft 1, is movable axially under the action of a control member 11 for the clutching, particularly in the direction of moving toward each other of the toothed wheel 4 such that the teeth 10 of the plates 7, 8 nest between each other so as to ensure, under the influence of the driving in rotation of the toothed wheel 4, a driving in rotation of the axially movable plate 8 and accordingly a driving in rotation of the output shaft 1 of the device.

The member 11 for controlling the clutch mechanism is preferably constituted by a fork with two branches, each branch of the fork being provided with a radial internal tooth 12 so as to ensure trapping the fork within an annular throat 13 external to the axially movable plate 8. This axially movable plate 8 can be secured in rotation to the output shaft 1 by means of channeling, as is shown in FIG. 1, or by means of cross members. In this case, the plate 8 comprises, on the internal periphery of its axial recess, at least two axial grooves arranged to coact slidably with at least two straddling members secured to the output shaft 1.

The plate 7, secured in rotation to the toothed wheel 4, can be made of one piece with this latter. However, because of the load incorporated into the toothed wheel 4, it is preferable to make the plate 7 in the form of an independent member. In this case, the hollowed plate 7 of the clutch mechanism, secured in rotation to the toothed wheel 4, is provided, on its surface opposite the one provided with the dog lug teeth 10, with fingers 9 fitting within openings 4A provided on the facing surface of the toothed wheel 4 to secure in rotation the plate 8 and the toothed wheel 4. These fingers 9 are preferably in the form of crenelations to form a circular line of crenelation. The securement in rotation of the toothed wheel 4 and the plate 7 thus takes place instantaneously during slidable introduction of the pieces on the output shaft 1 without requiring securement members or supplemental connections.

As mentioned above, clutching takes place by the dog lug by means of teeth 10 carried by the facing surfaces of the plates 7, 8. The surfaces of these teeth 10, adapted to come into contact during dog lugging, have a slope comprised within the range of 10 to 18°, preferably about 15°. Moreover, the teeth 10 of the hollowed plates 7, 8 have symmetric profiles to permit operation of the clutch mechanism in any direction of rotation of the toothed wheel 4. It will particularly be noted that each hollowed plate 7, 8 of the clutch mechanism comprises at most four teeth 10. The minimum angular distance between these teeth 10 of a hollowed plate 7, 8 is at least equal to 60°.

Thanks to the use of loading at the predetermined points in the device, it is thus possible to use, as a driven member as well as the pieces of the clutch mechanism, pieces made entirely of synthetic material. There results a lightening of the device and a reduction of its cost.

What is claimed is:

1. Transmission device between a primary motor shaft and an output shaft (1), comprising at least one casing (2) within which are disposed a reducing mechanism constituted by a driving member (3) in engagement with a driven member (4), the driven member (4), freely mounted rotatably on the output shaft (1), being adapted to be coupled with or uncoupled from said shaft (1) by means of a clutch mechanism mounted on said output shaft (1), wherein the driven member (4) is a tangent toothed wheel, of synthetic material, at least a constituent material of the teeth (5) of the toothed wheel (4) incorporating a mineral or organic load increasing the resistance to wear of said teeth (5), wherein the clutch mechanism is a dog clutch mechanism constituted by two hollowed plates (7, 8) bearing on their facing surfaces teeth (10), one (7) of the plates (7, 8) being secured in rotation to the toothed wheel (4) whilst the other plate (8) that can be secured in rotation with the output shaft (1) is movable axially under the action of a control member (11) for clutching in the direction toward the one of the plates (7) secured in rotation to the toothed wheel (4) such that the teeth (10) of the plates (7, 8) will be disposed between them so as to ensure, under the influence of driving in rotation the toothed wheel (4), a driving in rotation of the axially movable plate (8) and hence a driving in rotation of the output shaft (1) of the device, and wherein the control member (11) of the clutching mechanism comprises a fork with two branches, each branch of the fork being provided with a radial internal tooth (12) so as to ensure trapping the fork within an annular throat (13) external to the axially movable plate (8).

2. A transmission device for transmitting rotation from a motor shaft, comprising:

a driving member connectable to a motor shaft;

an output shaft;

a driven member on said output shaft that engages said driving member, said driven member being a tangent toothed wheel of synthetic material and having plural first teeth, said plural first teeth further incorporating a mineral or organic load increasing resistance to wear of said plural first teeth; and a dog clutch that selectively couples said driven member to said output shaft, said dog clutch having two hollow plates on said output shaft that are made of a synthetic material free from fibers and that have plural second teeth on their facing bearing surfaces, one of said two hollow plates being separate from said driven member and secured in rotation to said driven member, and another of said two hollow plates being securable in rotation with said output shaft and movable axially on said output shaft by a clutching control member in a direction toward said driven member so that said second teeth of said two hollow plates engage each other and, by rotation of said driven member, drive in rotation said output shaft.

3. Transmission device according to claim 2, wherein the load is constituted by glass fibers.

4. Transmission device according to claim 2, wherein the load represents from 20 to 50% by weight of the total weight of the toothed wheel.

5. Transmission device according to claim 2, wherein said first teeth extend only partially over the width of the wheel to provide a region in the form of a crown free from teeth so as to ensure mechanical reinforcement of the wheel.

6. Transmission device according to claim 2, wherein said two hollow plates are made of a synthetic material selected from the group consisting at least of polyoxymethylene and polyamide.

7. Transmission device according to claim 2, wherein said clutching control member comprises a fork with two branches, each branch of the fork being provided with a radial internal tooth so as to ensure trapping the fork within an annular throat external to the axially movable plate.

8. Transmission device according to claim 2, wherein said second teeth have a slope comprised within the range of 10 to 18 degrees.

9. Transmission device according to claim 2, wherein said second teeth have symmetrical profiles.

10. Transmission device according to claim 2, wherein each said hollow plate comprises at most four teeth.

11. Transmission device according to claim 2, wherein a minimum angular distance between two of said second teeth of one said hollow plate is at least equal to 60 degrees.

12. Transmission device according to claim 2, wherein said one hollow plate that is secured in rotation to said driven member is provided, on its surface opposite that with said second teeth, with dog clutch lugs with fingers framed within openings in said driven member the fingers having the shape of crenalations to form a line of circular crenalation.

13. Transmission device between a primary motor shaft and an output shaft (1), comprising at least one casing (2) within which are disposed a reducing mechanism constituted by a driving member (3) in engagement with a driven member (4), the driven member (4), freely mounted rotatably on the output shaft (1), being adapted to be coupled with or uncoupled from said shaft (1) by means of a clutch mechanism mounted on said output shaft (1), wherein the driven member (4) is a tangent toothed wheel of synthetic material, at least a constituent material of the teeth (5) of the toothed wheel (4) incorporating a mineral or organic load increasing the resistance to wear of said teeth (5), wherein the clutch mechanism is a dog clutch mechanism constituted by two hollowed plates (7, 8) bearing on their facing surfaces teeth (10), one (7) of the plates (7, 8) being secured in rotation to the toothed wheel (4) whilst the other plate (8) that can be secured in rotation with the output shaft (1) is movable axially under the action of a control member (11) for clutching in the direction toward the one of the plates (7) secured in rotation to the toothed wheel (4) such that the teeth (10) of the plates (7, 8) will be disposed between them so as to ensure, under the influence of driving in rotation the toothed wheel (4), a driving in rotation of the axially movable plate (8) and hence a driving in rotation of the output shaft (1) of the device, and wherein the hollowed plate (7) of the clutch mechanism that is secured in rotation to the toothed wheel (4), is provided, on its surface opposite that provided with the teeth (10), with dog clutch lugs with fingers (9) framed within openings (4A) on the facing surface of the toothed wheel (4) to secure in rotation the plate (7) and toothed wheel (4), the fingers (9) having the shape of crenalations to form a line of circular crenalation.

* * * * *